Oct. 21, 1952   R. F. WILLIAMS   2,614,292
THERMOPLASTIC COMPOSITIONS OF IMPROVED IMPACT STRENGTH
AND METHOD FOR THEIR PRODUCTION
Filed Nov. 9, 1948

ROBERT F. WILLIAMS
INVENTOR

BY *N. M. Perrins*
*Daniel J. Mayne*
ATTORNEYS

Patented Oct. 21, 1952

2,614,292

UNITED STATES PATENT OFFICE 2,614,292

THERMOPLASTIC COMPOSITIONS OF IMPROVED IMPACT STRENGTH AND METHOD FOR THEIR PRODUCTION

Robert F. Williams, Rochester, N. Y., assignor to Eastman Kodak Company, Rochester, N. Y., a corporation of New Jersey Application November 9, 1948, Serial No. 59,106

10 Claims. (Cl. 18—47.5)

This invention relates to the production of thermoplastic compositions and more particularly to a method of improving the impact strength of injection molded thermoplastic compositions.

While the impact strengths of most thermoplastics are satisfactory so that the thermoplastics may be employed for multiple uses, it would be desirable in many cases to employ thermoplastic compounds having considerably higher impact strengths. Of course, the production of new fundamental types of thermoplastic compositions might be a desirable solution for the problem. However, with the present production and molding techniques well established a method of imparting higher impact strengths to presently known thermoplastics would be even more desirable. In fact, it is an object of the present invention to provide a novel method of increasing the impact strength of various known injection molded thermoplastic compositions without disadvantageously affecting other properties of the thermoplastics. Other objects of the invention are improved thermoplastic injection molding compositions which when injection molded will have high impact strength.

In accordance with the invention, I have found that the impact strength of an injection molded article can be greatly increased by employing a molding composition comprising a major amount of one composition with a minor amount of a second composition which is somewhat incompatible with the major composition. If the compositions are in granular form the minor composition should be fairly uniformly distributed throughout the major composition prior to the injection molding operation. A very satisfactory method of attaining the desired relation is to spray a thin coating of the minor composition onto granules of the major composition. The second composition acts to prevent the granules of the major molding compound from flowing as a continuous amorphous mass when heat and pressure are applied during the molding operation.

The ability of the second thermoplastic material to prevent the normal amorphous flow of the major molding composition appears to be related to the compatibility of the second material with the major thermoplastic material. The second material must be of such composition that its compatibility with the major molding compound causes the second material to flow in microscopic layers. When a conventional molding compound is injection molded, strain lines can be seen when the molded piece is placed between polarized plates set at extinction. These strain lines are almost continuous, usually running parallel to the direction of flow. If the same molding compound is treated in accordance with the present invention with a small amount of a material of limited compatibility and molded under identical conditions, the field of strain as shown by the polarized plates is greatly reduced and appears as interrupted small patterns, showing the strain to have been placed on individual portions and not on the entire piece. When the molding compound is treated with a small amount of material of limited compatibility and molded at lower temperatures than normally employed in molding such compositions, the piece can be separated in ribbons running parallel to the direction of flow.

These facts point to a peculiar and desirable structure in the molded piece resulting from the proper choice and combination of materials. The compatibility of the two materials in general should be such that the identity of one is lost in the other when intimately mixed in limited ratios, but the incompatibility must be sufficient to prevent the minor material from being diffused in the major material on contact.

The invention is further illustrated in the following detailed description and drawings wherein.

Figure 1:
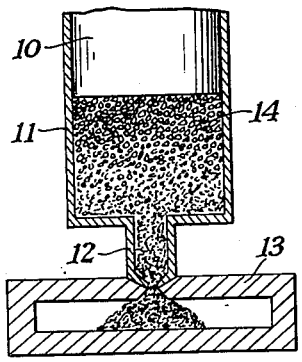
Fig. 1 is a schematic view of a typical injection molding compound being forced into a rectangular mold by an injection molding device.
Figure 3:
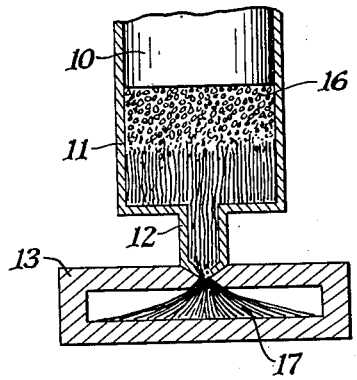
Fig. 3 is a schematic view of an injection molding device forcing a thermoplastic composition, made in accordance with the present invention, into a rectangular mold. The tendency of the plastic to flow in a layer is depicted in the drawing.
Figure 4:
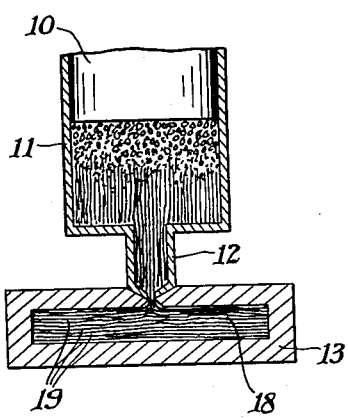
Fig. 4 is a similar schematic view to that of Fig. 3 showing the completely molded piece and illustrating the layers formed in the molded piece made in accordance with the present invention.

In the following description similar numbers represent similar parts in the drawings. As shown in Figs. 1, 3 and 4, the piston of the injection molding device is represented by 10, the cylinder by 11, the nozzle by 12 and the mold by 13. The operation of injection molding apparatus being well understood in the art operation details will be omitted.

Figure 2:
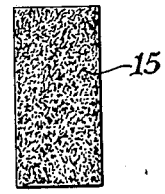
Fig. 2 is an end view of the molded piece resulting from the operation of Fig. 1 showing the amorphous structure of the piece.
Figure 5:
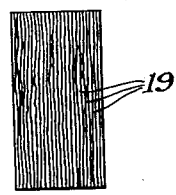
Fig. 5 is an end view of the piece as formed in the process shown in Fig. 4 also showing these layers.

Referring to Fig. 1, the cylinder 11 is filled with granular thermoplastic molding material 14 such as the cellulose acetate composition available on the market which on being heated by means, not shown, gradually changes to a flowable mass. The down thrust of piston 10 forces the hot plastic through the nozzle 12 and into the mold 13 where the plastic assumes the form of the mold cavity and is cooled until solid. An examination of the molded piece 15 shown in Fig. 2 indicates that it is an amorphous solid and, therefore, as will be subsequently shown has a relatively lower impact strength than does the corresponding molded piece made in accordance with the instant invention. Referring to Fig. 3, a granular molding composition 16, which has been thinly coated by any suitable method, for example, spray coating from a solvent solution in accordance with my invention with a second molding composition of limited compatibility, is heated and forced into the cooled mold. As shown at 17, this composition will flow lengthwise of the mold and produce striated layers in the molded piece in the direction of line of flow. The resulting molded piece 18 shown in the mold in Fig. 5 contains a multiplicity of layers 19. The end view of the piece 18 showing the layers is shown in Fig. 5.

The ratio of the minor material of limited compatibility to the major material constituting the bulk of the injection-molded piece is dependent on the limits of compatibility of the two materials.

EXAMPLE I

This may be illustrated by dividing granules of a plasticized cellulose acetate butyrate molding composition into three portions and spray coating the individual portions with plasticized cellulose acetate butyrate compositions, from a 5% solution in acetone, differing from each other and from the selected portions in total acyl content. The three samples are then separately injection-molded and tested for impact strength. It will be apparent from the following table that as the acyl contents of the major and minor compositions approach each other the impact strength falls, but as the difference in the acyl content of the two compositions increases the impact strength increases.

*Table I*

| Sample | Total Percent Acyl | | Ratio in Parts of Major to Minor | Izod Impact |
|---|---|---|---|---|
| | Major | Minor | | |
| A | 52.5 | 56.2 | 99:1 | 3.5 |
| B | 52.5 | 54.0 | 99:1 | 1.6 |
| C | 52.5 | 51.8 | 99:1 | 1.0 |

Therefore, the ratio of major material to minor material should be always determined for particular materials. In general, I have found that the materials that give the most satisfactory results are usually found to be those that give a maximum increase in impact when 1 to 5 parts of minor material are used with 99 to 95 parts of major material.

EXAMPLE II

Granules of a plasticized cellulose acetate butyrate molding composition were spray coated with a 5% solution of ethyl cellulose phthalate in acetone. The resulting composition was injection molded into a bar suitable for testing by the Izod impact test. Table II shows the improvement in impact strength over that of an untreated similar sized injection molded piece.

*Table II*

| Sample | Major Composition | Minor Composition | Ratio Major to Minor | Izod Impact |
|---|---|---|---|---|
| D | Cellulose Acetate Butyrate | Ethyl Cellulose Phthalate | 78:1 | 6.5 |
| E | do | None | None | 0.6 |

EXAMPLE III

Granules of a plasticized cellulose acetate molding composition were spray coated with a 5% polyamid of low molecular weight, such as nylon. The granules were then injection-molded into a bar suitable for testing by the Izod impact test. Table III shows the improvement in impact strength over that of an untreated similar sized injection-molded piece.

*Table III*

| Sample | Major Composition | Minor Composition | Ratio Major to Minor | Izod Impact |
|---|---|---|---|---|
| F | Cellulose Acetate | Polyamid | 99:1 | 7.5 |
| G | do | None | None | 3.0 |

EXAMPLE IV

Granules of polystyrene were spray coated with a 5% cellulose acetate-acetone solution. The granules were then injection-molded into a bar suitable for testing by the Izod impact test. Table V shows the improvement in impact over that of an untreated similar sized injection-molded piece.

*Table IV*

| Sample | Major Composition | Minor Composition | Ratio Major to Minor | Izod Impact |
|---|---|---|---|---|
| H | Polystyrene | Cellulose Acetate | 49:1 | 2.1 |
| I | do | None | None | 1.0 |

EXAMPLE V

Granules of polystyrene were also spray coated with the solution of low molecular weight polyamid. The granules were then injection molded into a bar suitable for testing by the Izod impact test. Table V shows the improvement in impact strength over that of an untreated similar sized injection molded piece.

*Table V*

| Sample | Major Composition | Minor Composition | Ratio Major to Minor | Izod Impact |
|---|---|---|---|---|
| J | Polystyrene | Polyamid | 99:1 | 1.0 |
| K | do | None | None | 0.7 |

EXAMPLE VI

Granules of ethyl cellulose were spray coated with the solution of low molecular weight polyamid. The granules were then injection-molded into a bar suitable for testing by the Izod test. Table VI shows the improvement in impact strength over that of an untreated similar sized injection-molded piece.

Table VI

| Sample | Major Composition | Minor Composition | Ratio Major to Minor | Izod Impact |
|---|---|---|---|---|
| L | Ethyl Cellulose | Polyamid | 99:1 | 6.5 |
| M | do | None | None | 3.9 |

EXAMPLE VII

The following table also indicates the percent improvement in impact strength when granules containing a cellulose acetate butyrate ester of an acyl content of 37% butyryl and 17% acetyl were spray coated with a second composition containing cellulose acetate butyrate of an acyl content of 47% butyryl and 6.5% acetyl. The compound designation S, M and H indicate that the major compositions differ in respect to plasticizers or other components, but of course that does not affect the relative comparison between the same compositions respecting impact results.

Table VII

| Name | Ratio Major to Minor | Izod Impact | Percent Improvement |
|---|---|---|---|
| S2 | 95:5 | 6.6 | 228 |
| S2 | 98:2 | 10.5 | 437 |
| S2 | 99:1 | 9.9 | 412 |
| S3 | 98:2 | 10.8 | 385 |
| S3 | 99:1 | 8.3 | 296 |
| S4 | 98:2 | 6.6 | 189 |
| S4 | 99:1 | 6.8 | 194 |
| S4 | 84:16 | 5.6 | 310 |
| S5 | 98:2 | 3.6 | 450 |
| H5 | 99:1 | 2.8 | 350 |
| H5 | 98:2 | 7.4 | 370 |
| M | 99:1 | 6.4 | 320 |
| M | | | |

The granules of the major composition may be coated with the minor composition by spray coating from an acetone solution of minor composition. Any suitable method of exposing the granules to the spray known in the art may be employed. For example, the granules may be permitted to fall by gravity through one or more sprays issuing from spray guns. The term granules in the following claims includes particles, small pieces, pellets, etc. Preferably, the granule size is from approximately ⅛ to 1/16 inch square although larger or smaller regular or irregular sizes may be employed. If desired, the granules after being sprayed with the second composition may be heat dried to expel excess solvent remaining in the composition sprayed on the granules. If the final composition is made up of two powders or from two granular compositions these may be thoroughly tumbled and mixed to achieve the desired uniform distribution.

I claim:

1. The method of increasing the impact strength of a cellulose ester molding composition selected from the group consisting of cellulose acetate and cellulose acetate butyrate molding compositions by more than 100% which comprises coating granules of the selected composition with a minor proportion of a second slightly incompatible molding composition selected from the group consisting of cellulose acetate butyrate of a substantially higher acyl content, a polyamid of low molecular weight and ethyl cellulose phthalate the ratio of the major to the minor composition being at least 78:1, and injection molding the coated composition.

2. The method of increasing the impact strength of a cellulose acetate butyrate molding composition by more than 100% which comprises spray coating granules of the composition with a minor proportion of a polyamid of low molecular weight and injection molding the coated composition.

3. The method of increasing the impact strength of a cellulose acetate butyrate molding composition by more than 100% which comprises spray coating granules of the composition with a minor proportion of another acetate butyrate composition having a substantially higher acyl content the ratio of the major to the minor composition being at least 99:1, and injection-molding the coated composition.

4. The method of increasing the impact strength of a cellulose acetate butyrate molding composition by more than 100% which comprises spray coating granules of the composition with a minor proportion of ethyl cellulose phthalate, and injection-molding the coated composition.

5. The method of increasing the impact strength of a cellulose acetate molding composition by more than 100% which comprises spray coating granules of the composition with a minor proportion of a low molecular weight polyamid, and injection-molding the composition.

6. A molding composition comprising granules of cellulose acetate butyrate having a thin coating of low molecular weight polyamid thereon.

7. A molding composition comprising granules of cellulose acetate butyrate having a thin coating of ethyl cellulose phthalate thereon.

8. A molding composition comprising granules of cellulose acetate butyrate having thereon a thin coating of a second cellulose acetate butyrate of higher acyl content.

9. The method of increasing the impact strength of a cellulose organic acid ester molding composition by more than 100% which comprises spray coating granules of a cellulose acetate butyrate molding composition having an acyl content of 52.5% with another cellulose acetate butyrate having an acyl content of 56.2%, the resulting composition containing a ratio of 99 parts of the lower acyl content ester to 1 part of the higher acyl content ester, and injection molding the thus coated composition.

10. The method of increasing the impact strength of a cellulose organic acid ester molding composition by more than 100% which comprises spray coating granules of a cellulose acetate molding composition with a polyamid, the resulting composition containing 99 parts cellulose acetate to 1 part polyamid, and injection molding the composition.

ROBERT F. WILLIAMS.

REFERENCES CITED

The following references are of record in the file of this patent:

UNITED STATES PATENTS

| Number | Name | Date |
|---|---|---|
| 2,353,457 | Goessling | July 11, 1944 |
| 2,364,024 | Hayes | Nov. 28, 1944 |
| 2,377,231 | Hayes | May 29, 1945 |
| 2,484,792 | Mollring | Oct. 11, 1949 |